H. G. SAECKER.
CLUTCH.
APPLICATION FILED FEB. 2, 1911.
990,906.
Patented May 2, 1911.
2 SHEETS—SHEET 1.
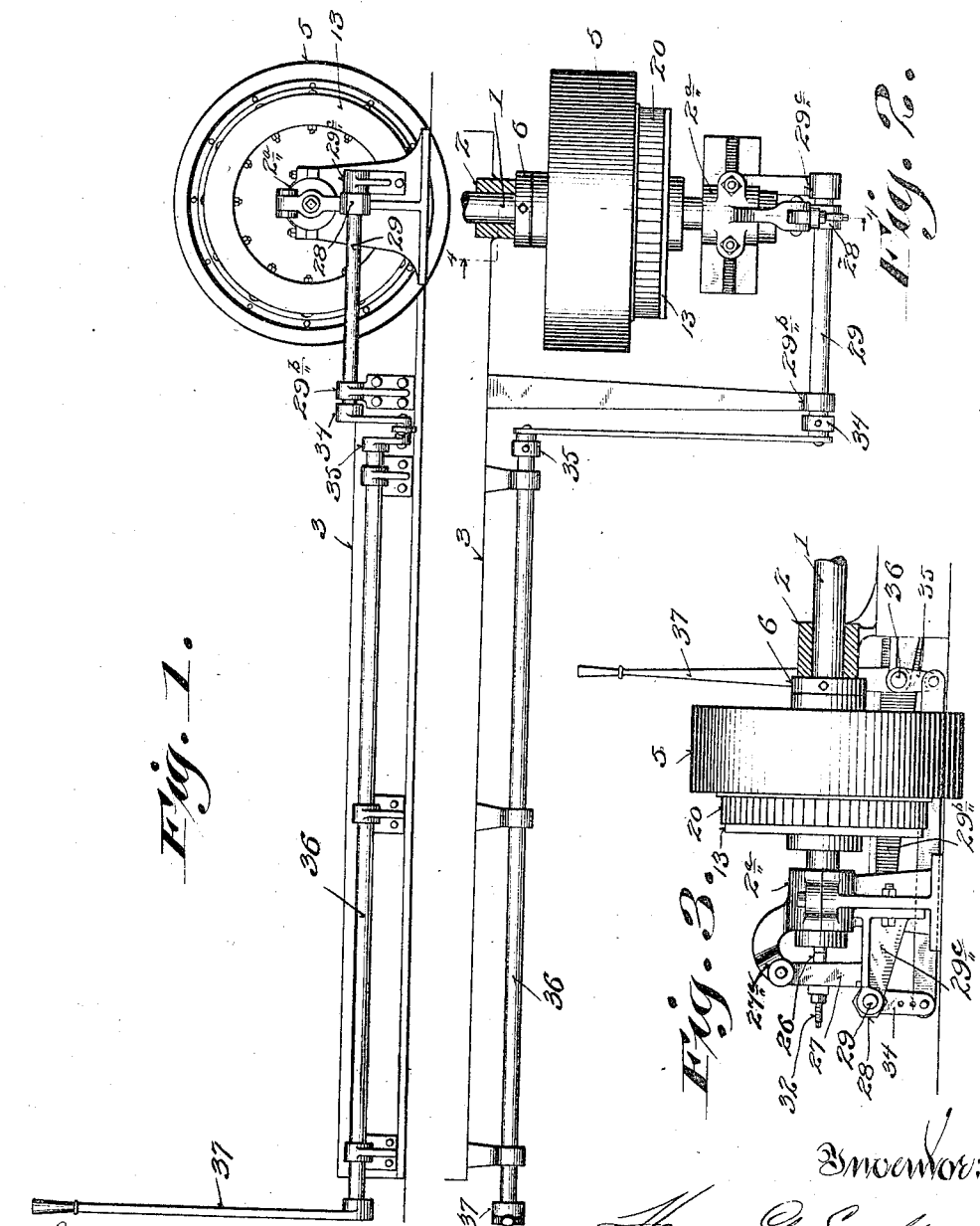

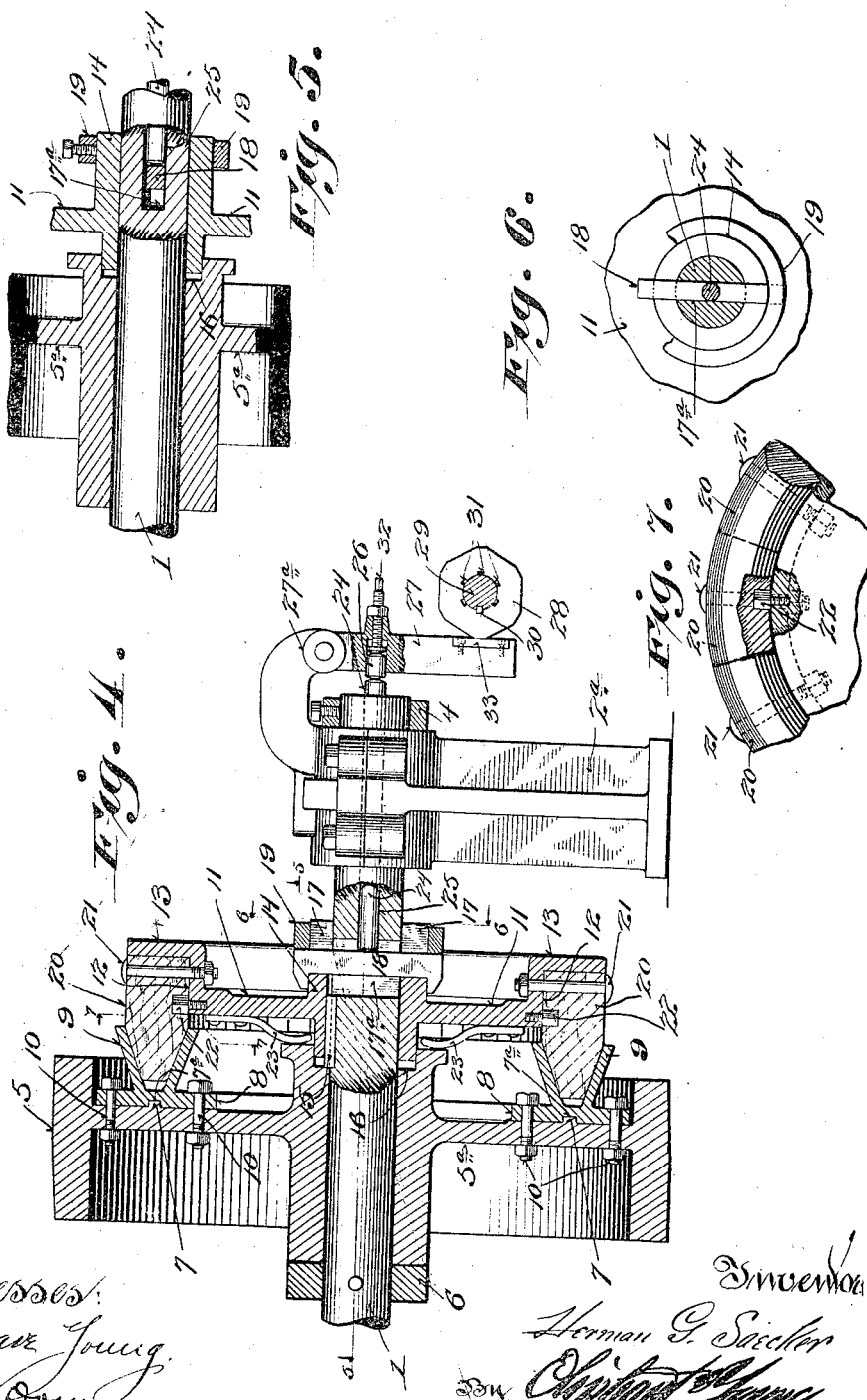

UNITED STATES PATENT OFFICE.

HERMAN G. SAECKER, OF APPLETON, WISCONSIN.

CLUTCH.

990,906.

Specification of Letters Patent.

Patented May 2, 1911.

Application filed February 2, 1911. Serial No. 606,147.

*To all whom it may concern:*

Be it known that I, HERMAN G. SAECKER, a citizen of the United States, and resident of Appleton, in the county of Outagamie and State of Wisconsin, have invented certain new and useful Improvements in Clutches; and I do hereby declare that the following is a full, clear, and exact description thereof.

My invention has for its object to provide a simple, durable and effective friction clutch mechanism, the construction and arrangement being especially designed with reference to its control whereby manual power is applied through a system of levers to a plunger that is centrally disposed within one end of a power-shaft. The plunger being upon the axis of motion thereby reduces friction incidental to end thrust in applying the clutch power equally in all directions to the slidable clutch member whereby external spanners or the like clutch-controlled mechanisms are dispensed with.

Other objects of my invention are to provide structural features in connection with the clutch mechanism whereby the clutch parts are reduced in number, being capable of economical assembly and when so assembled the same constitute slidable and rotatory members of a friction clutch.

With the above objects in view my invention consists in certain peculiarities of construction and combination of parts as set forth hereinafter with reference to the accompanying drawings and subsequently claimed.

In the drawings Figure 1 represents a general view in elevation of a clutch mechanism embodying the features of my invention; Fig. 2, a plan view of the same; Fig. 3, a detail rear elevation of the clutch mechanism; Fig. 4, an enlarged detail sectional elevation of the clutch mechanism, the section being indicated by line 4—4 of Fig. 2; Fig. 5, an enlarged detail sectional view of the hub portions of the fast and loose clutch members illustrating the shaft partly broken away and in section to more clearly show the key and slot connection; Fig. 6, a detail transverse section as indicated by line 6—6 of Fig. 4, and Fig. 7, a detail fragmentary view showing the manner of securing the segmental clutch blocks to the slidable clutch member, the view being partly broken away and in section as indicated by line 7—7 of Fig. 4.

Referring by characters to the drawings, 1 represents a power-shaft journaled in an intermediate bearing 2 that extends from a frame 3, one end of the shaft being journaled in a bearing-block 2ª, through which bearing the shaft projects and is provided with a thrust collar 4 that is secured thereto by a suitable set-bolt. A loose pulley 5 is mounted upon the shaft, the outer hub face of which abuts a thrust-collar 6 that is secured to said shaft and arranged to abut the adjacent face of the intermediate bearing 2. The pulley-web 5ª is provided with a circular tongue 7 that is concentric with the pulley axis, the tongue being arranged to fit within a circular groove 7ª of a flange 8 that forms part of a circular V-groove clutch-ring 9, the same being secured to the pulley-web 5ª by a series of bolts 10 that are fitted through apertures in the clutch-ring flange.

By utilizing a construction as described above positive concentric alinement of the clutch-ring relative to the shaft axis is insured, while, at the same time, strain upon the bolts 10 is relieved by means of the circular tongue and groove connection and further, by utilizing a detachable ring in connection with the pulley, the same can be readily replaced at small cost compared to the cost of furnishing an entire pulley, which pulley constitutes the loose clutch-member. The slidable or fast clutch member comprises a disk 11 having a horizontally disposed annular rim 12, extending from one edge of which rim is a vertical flange 13, the hub 14 of the disk being slidably mounted upon the shaft 1 and is held against rotation thereon by a spline 15 carried by the shaft, which spline is seated within a groove formed in the bore of the disk hub. The outer face of the disk hub is housed within a circular recess 16 formed in the inner end face of the pulley hub while the opposite or inner end of said disk hub 14 is provided with alined radial slots 17, which recesses in the assemblage of the mechanism are arranged to coincide with a radially disposed slot 17ª formed in the power-shaft 1 for the reception of a double-headed flat key 18 as best illustrated in Figs. 4, 5 and 6. The key 18 is shouldered against the bottom walls of the disk-hub slots, the heads of the key being arranged to overlap the periphery of said disk-hub, whereby the key is held against transverse movement, being locked in this position by a collar 19 that is fitted over the slotted end of the aforesaid disk hub and secured thereto by a set-screw or other suitable means, it being understood that the collar is slipped into position after the key is inserted.

As shown in Figs. 4 and 7, a series of V-shaped segmental clutch-blocks 20 are fitted about the disk-rim 12, the V-shaped ends thereof being arranged to engage the V-shaped groove of the clutch-ring 9, while the opposite ends of the blocks are abutted against the disk flange 13. Each block is secured to the disk-rim by a single radially disposed bolt 21 and held against twisting thereon by the head 22 of a bolt that is in threaded engagement with said disk rim, the head being seated within a recess formed in the bottom face of the clutch-block.

By the above described construction an unbroken rigid annular friction surface is formed in connection with the disk or slidable clutch-member presenting a V-shaped clutching surface to the V-shaped groove of the rotary clutch-member. These friction surfaces are normally held against engagement by two or more leaf-springs 23, ends of which leaf-springs are secured to the disk-web and so arranged that their free ends exert pressure upon the adjacent end-face of the pulley-hub. Clutching engagement of the rotary and slidable clutch members is had by exerting pressure upon the key 18 through engagement with one end of a plunger-rod 24, the rod being loosely mounted in a centrally bored aperture 25 of the power-shaft. The shaft-aperture extends from one end of the power-shaft and communicates with the radial slot 17ª thereof, the outer end of the plunger-rod being crowned and extended slightly beyond the end of said shaft for engagement with the crowned end of a button 26 that is loosely mounted within a recess of a lever 27, which lever is fulcrumed to an arm 27ª that projects from the bearing-block 2ª. Hence when this lever 27 is forced in the direction to engage the plunger-rod, the button carried thereby will engage and cause movement of the plunger-rod whereby pressure is exerted upon the key to effect locking engagement between the rotary and slidable clutch-members, it being understood that when said members are locked they rotate in common with the power-shaft, power being applied to the loose pulley 5 continuously from any suitable source by an endless belt not shown.

The clutching force is applied to the lever 27 by means of one face of a polygonal block 28, which block is secured to a rock-shaft 29 by a key 30 that is arranged to fit any one of a series of key-ways 31 formed in the bore of the block, the same corresponding in number to the engaging faces of said block. Thus when any one of the engaging faces of the block becomes worn the same may be shifted upon the shaft to present a new face to the lever. All of the engaging faces of the block are upon the same circular plane and will therefore impart the same cranking movement to the lever, which movement is figured to be approximately correct for imparting the desired clutch pressure. But, in order that the pressure may be definitely controlled, I have provided an adjusting screw 32 that is in threaded engagement with the lever 27 and arranged to contact with the bottom of button 26 whereby the same may be moved in or out relative to its seating aperture. Thus clutching strain is taken up directly upon the hard metal adjusting screw at this point, said strain being also taken at the engaging points between the hard metal block and lever by the interposition of a hardened plate 33 that is fitted to said lever.

As it is desirable in some instances to actuate the clutch mechanism from a distant point, I have devised a system of levers in link connection with each other whereby motion is transmitted to the rock-shaft 29, which rock-shaft is journaled in bearings 29ᶜ and 29ᵇ of brackets carried by the bearing-block 2ª and frame 3 respectively as best shown in Figs. 1, 2 and 3. One end of the rock-shaft carries an arm 34 that is in link connection with a similar arm 35, which arm is secured to one end of a rod 36 that is journaled in bearings that extend from the frame 3, the opposite end of the rod 36 being provided with an actuating hand-lever 37.

By the above described system of levers the operator can be located at a convenient point in juxtaposition to the work engaging his attention and thus control of the clutch power by a slight movement of the hand-lever 37 is had whereby the continuously driven rotary clutch-member will be engaged by the slidable clutch-member in order to impart drive to the shaft.

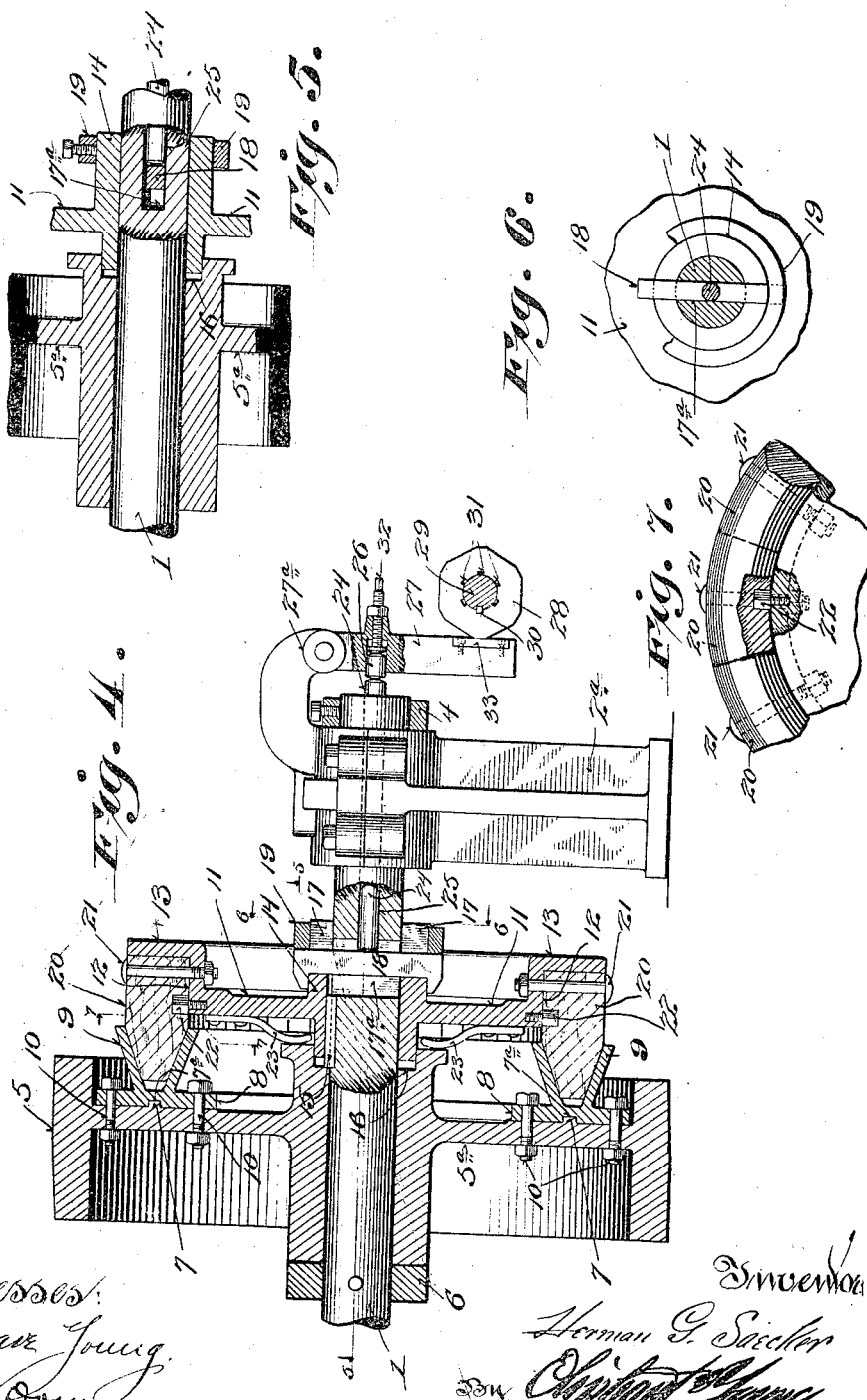

I claim:

1. A clutch-mechanism comprising a shaft having a transversely disposed slot and a longitudinal centrally disposed aperture communicating with the slot and one of the shaft ends, a clutch-member in rotary engagement with the shaft, a second clutch-member in slidable engagement with said shaft, springs interposed between the clutch-members, a key carried by the slidable clutch-member engaging the shaft-slot, a plunger-rod fitted within the longitudinal shaft-aperture for engagement with the key, one end of the plunger-rod being extended beyond the shaft end, a lever for engagement with said plunger-rod, a rock-shaft, and a polygonal-faced block carried by the rock-shaft for engagement with the lever.

2. A clutch mechanism comprising a shaft having a transverse slot, and a longitudinal